(12) United States Patent
Chu et al.

(10) Patent No.: US 6,597,479 B1
(45) Date of Patent: Jul. 22, 2003

(54) FIBER QUADRUPLER DEVICE METHOD FOR PROVIDING FULL DUPLEX COMMUNICATIONS TO A SYNCHRONOUS OPTICAL NETWORK OVER A SINGLE OPTICAL FIBER

(75) Inventors: Fred Chu, Madison, AL (US); Kevin W. Schneider, Huntsville, AL (US); Peter O. Brackett, Huntsville, AL (US); W. Stuart Venters, Huntsville, AL (US); Steven R. Blackwell, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/427,128

(22) Filed: Oct. 22, 1999

(65) Prior Publication Data (65)

(51) Int. Cl.[7] .............. H04B 10/00; H04J 14/02
(52) U.S. Cl. .......... 359/113; 359/174; 359/124; 359/110; 359/128; 359/119
(58) Field of Search .................. 359/113, 174, 359/175, 119, 110, 128, 124

(56) References Cited

U.S. PATENT DOCUMENTS

| | | | |
|---|---|---|---|
| 4,759,011 A | 7/1988 | Hicks, Jr. .................. 367/191 |
| 4,787,706 A | 11/1988 | Cannon, Jr. et al. .......... 385/59 |
| 5,050,952 A | 9/1991 | Fussgager .................. 359/114 |
| 5,140,152 A | 8/1992 | Van Zeghbroeck ..... 250/214 A |
| 5,272,555 A * | 12/1993 | Suzuki ..................... 359/113 |
| 5,317,440 A * | 5/1994 | Hsu ......................... 359/113 |
| 5,317,441 A | 5/1994 | Sidman ..................... 359/113 |
| 5,367,395 A * | 11/1994 | Yajima et al. ............. 359/110 |
| 5,371,622 A * | 12/1994 | Khoe et al. ................ 359/113 |
| 5,408,350 A * | 4/1995 | Perrier et al. .............. 359/113 |
| 5,418,869 A * | 5/1995 | Seike et al. ................ 359/113 |
| 5,680,238 A * | 10/1997 | Masuda ..................... 359/125 |
| 5,694,232 A | 12/1997 | Parsay et al. .............. 359/113 |
| 5,796,899 A | 8/1998 | Butrie et al. ............... 385/92 |
| 5,847,852 A | 12/1998 | Domon et al. .............. 359/118 |
| 6,031,645 A * | 2/2000 | Ichikawa ................... 359/113 |
| 6,046,833 A * | 4/2000 | Sharma et al. ............. 359/110 |

* cited by examiner

Primary Examiner—Leslie Pascal
Assistant Examiner—David C. Payne
(74) Attorney, Agent, or Firm—Waddey & Patterson, PC; Larry W. Brantley (57) ABSTRACT

A fiber quadrupler device and method multiplexes the four optical fibers in a synchronous optical network (SONET) ring into a single linking fiber for full duplex optical transmission. The fiber quadrupler device optically couples two of the SONET fibers to a transmit converter for communications of downstream data from the SONET ring to a network element linked to the quadrupler by a single linking fiber. Two other SONET ring fibers are optically coupled to a receive converter for communications of upstream data from the network element over the single linking fiber to the SONET. An optical transceiver processes and directs the downstream and upstream signals to the receive and transmit converters. Either subcarrier modulation (SCM) or wavelength division multiplexing (WDM) is used in the receive and transmit converters.

23 Claims, 9 Drawing Sheets

*FIG. 1*

*(PRIOR ART)*

FIBER QUADRUPLER DEVICE METHOD FOR PROVIDING FULL DUPLEX COMMUNICATIONS TO A SYNCHRONOUS OPTICAL NETWORK OVER A SINGLE OPTICAL FIBER

BACKGROUND OF THE INVENTION

This invention relates to optical data communication systems and, more specifically, to devices and methods for providing efficient use of optical fibers needed for full duplex data communications in a synchronous optical network (SONET).

The use of optical fibers for data transmission is increasing. Optical fibers are now used for data communications in local area networks, national and international telecommunications, cable television distribution, and in other communications services. Although the cost of optical fiber has been significantly reduced in recent years, the cost of fiber installation is still high. Accordingly, there is a need to use installed fibers in a more efficient manner.

In many fiber transmission systems, conversions are made between optical signals and electrical signals. For example when telecommunication signals, such as DS3 signals, are multiplexed for fiber transmission, the DS3 signals are multiplexed and sent to an optical transmitter. The optical transmitter converts the electrical signals to optical signals using electrical to light conversion devices such as light emitting diodes or laser diodes. The optical signal is then directed to one or more receiving stations for conversion back to electrical signals. The optical receiver that converts the received optical signal to an electrical signal must provide relatively error free DS3 signals at each receiving station.

The continued improvement in optical components allows for more efficient use of fibers. It is not unusual to find data rates over fiber greater than several hundred megabits per second. The bandwidth capacity of optical fibers makes them suitable for use in a local area network (LAN), in LAN-to-LAN connections, in telecommunications applications, and in links from optical networks to loop access systems.

Figure 1:
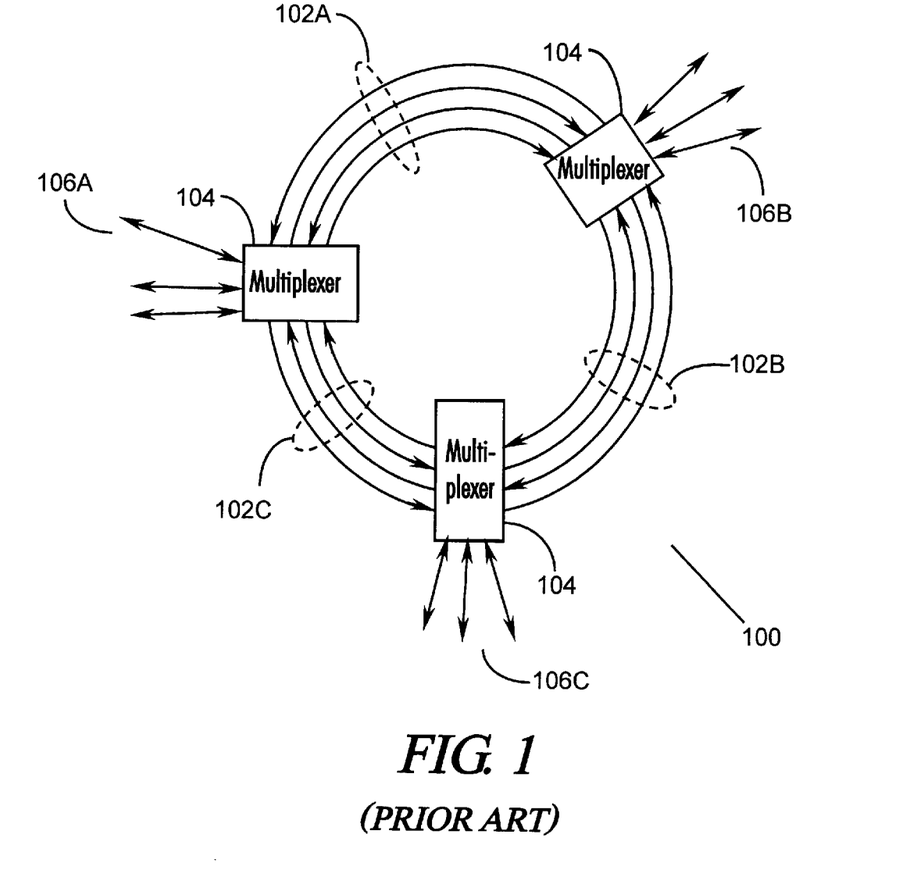
FIG. 1 is a schematic diagram of a conventional synchronous optical network (SONET) ring with three conventional SONET access multiplexers providing access to the four fibers of the network from three SONET access loops.

A SONET ring may serve as a wide area network (WAN)-to-WAN connection link. In a standard implementation of a SONET ring, two fibers are used to provide full duplex communications. These are conventionally referred to as "active" fibers. In addition, technical standards adopted for commercial SONET rings require a "one-to-one" fiber redundancy to protect the network against failure of one or both of the active fibers. To provide this protection, a SONET ring will also have two protection fibers for backup, for a total of four fibers. Normally, the protection fibers carry no data, only SONET framing information and idle fields. Thus, in a conventional SONET ring, the capacity of the fibers is underutilized because of the requirement for protection fibers. One example of a prior art implementation of a SONET ring optical fiber system 100 is shown in FIG. 1. Three conventional SONET access loops 106A, B, and C are coupled together via SONET access (add/drop) multiplexers 104 and a synchronous optical network ("SONET") ring 102A, B, and C, using four fibers as the coupling link. SONET technologies are well known in the art, as specified in various industry standards such as Bellcore GR-253; ANSI TI305, and ITU G-870-875. The SONET ring connection of FIG. 1 conventionally uses four fibers, two active fibers for duplex data communications and two protection fibers reserved for backup and protection of the SONET ring. The SONET access loops 106A, B, and C may be a wide area network (WAN), a digital loop carrier (DLC), a cable TV distribution network, etc., and may have data rates in the hundreds of megabits per second. The SONET ring 102A–C coupling the SONET access loops 106A, B, and C may be operated at a variety of data rates depending on the design limitations and the needs of the user. SONET ring data rates vary from near 50 megabits per second to in excess of several gigabits per second.

In linking a local loop access system, private network, or other network element to a SONET ring, the owner of the loop access system, private network, or network element must make a decision as to whether to continue the redundant SONET ring fiber topology within that link. In making that decision, the availability and cost of installing and/or leasing the fibers is an important factor. As demand for data and data rates increases, a more efficient use of fibers can be of benefit to service providers and users. In some network-to-local loop access systems, such as the Total Access system available from ADTRAN, Inc. of Huntsville, Ala., two fibers are used to couple a SONET ring to an access interface module. Unfortunately, conventional devices and systems that provide communications links to SONET rings have not given a user the option of implementing that link over a single fiber while still providing full duplex communications.

SUMMARY OF THE INVENTION

It is a principal object of the present invention to provide an apparatus and means for more efficient use of optical fibers in a communications link to a SONET ring, thereby freeing fibers for other services.

Another object of the present invention is to provide for a more efficient use of optical fibers without reducing the quality of service.

Yet another object of the present invention is to increase the efficiency of fiber utilization by using standard optical and electrical components that provide a cost effective and reliable solution.

The present invention implements these and other objectives by multiplexing the four fibers in a SONET ring into a single linking fiber for full duplex, multichannel optical transmission. To accomplish this, a fiber quadrupler device and method of this invention optically couples two of the SONET fibers to two data inputs of a transmit converter, for communications of downstream data from the SONET ring to a network element linked to the quadrupler by a single linking fiber. The two remaining SONET fibers are optically coupled to two data outputs of a receive converter, for communications of upstream data from the network element over the single linking fiber, to the SONET. An optical transceiver processes the downstream transmit signals from the transmit converter and directs them across the linking fiber to the network element. The optical transceiver also receives the upstream optical signals sent from the network element over the linking fiber and directs them to the receive converter.

In a first embodiment of the fiber quadrupler device, the optical downstream and upstream data signals are converted into electrical signals. RF subcarrier modulation (SCM) is used in the transmit converter to combine the downstream data from the two data input fibers into a single multiplexed electrical signal. Conversely, RF demodulators in the receive converter separate the RF subcarriers in the multiplexed upstream signal so that the data can be directed to the corresponding data output fibers.

In a second embodiment of the fiber quadrupler device, the upstream and downstream data are processed only as optical signals, using wavelength division multiplexing (WDM) in the transmit converter to multiplex the downstream data signals and wavelength selective demultiplexing of the upstream data signals sent over the linking fiber from another network element.

Preferably, the upstream and downstream data signals sent to and received from the SONET ring are amplitude modulated using conventional digital modulation techniques (e.g., pulse amplitude modulation or amplitude shift keying) for actual communication of data over the RF/optical carriers and subcarriers.

DESCRIPTION OF THE PREFERRED EMBODIMENTS

Figure 2:
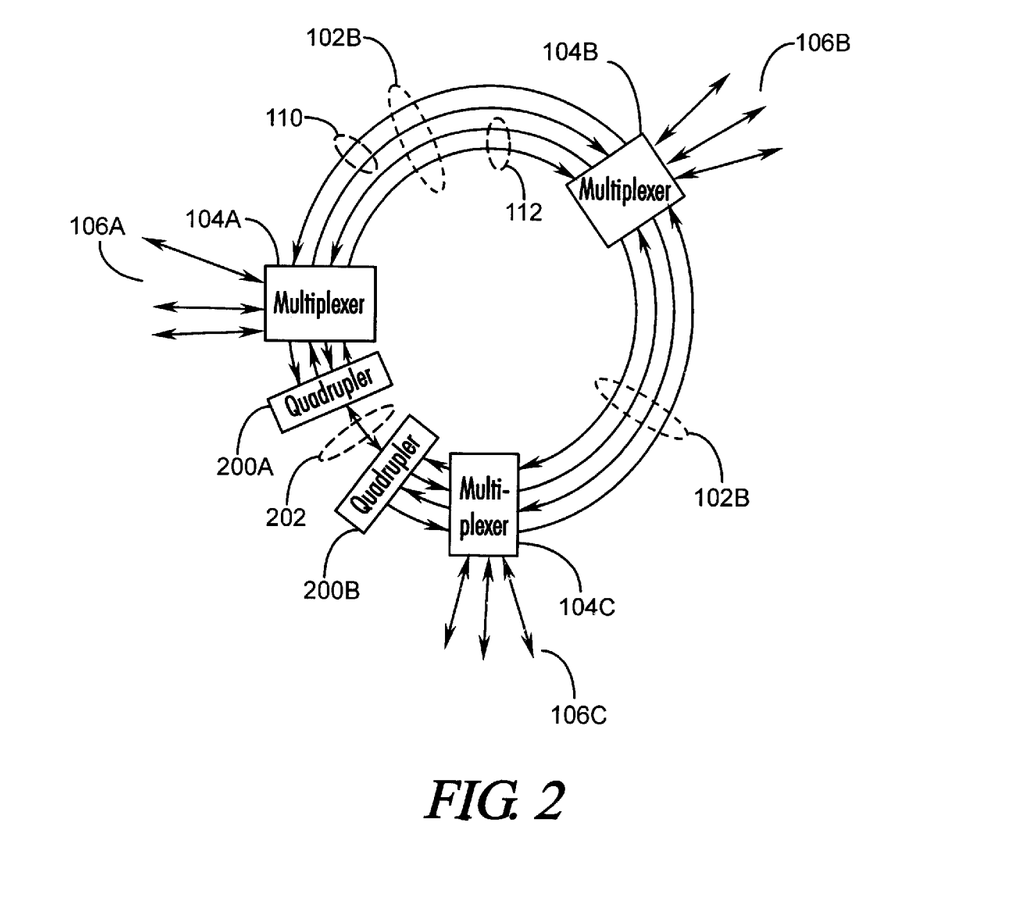
FIG. 2 is a schematic diagram of a SONET ring modified by use of a pair of fiber quadrupler devices and a single linking fiber in accordance with the present invention.

One embodiment of an optical data system 100 configured in accordance with the present invention is shown schematically in FIG. 2. Three network elements, which can be SONET access loops 106A, B, and C, are connected to a SONET ring 102 having a pair of active fibers 110 and a pair of protection fibers 112. One of the access loops 106B is coupled to the SONET ring 102 by a conventional network device 104B, such as a SONET access multiplexer. The other access loops 106A and 106C are coupled to the SONET ring 102 by fiber quadrupler devices 200A and 200B in accordance with this invention, which are then are linked to each other by a single linking fiber 202. The fiber quadrupler devices 200A and 200B and linking fiber 202 (shown also in FIG. 4) provide the data communication services of the four SONET fibers used to couple the network elements (multiplexers 104) as shown in the prior art system of FIG. 1.

Figure 4:
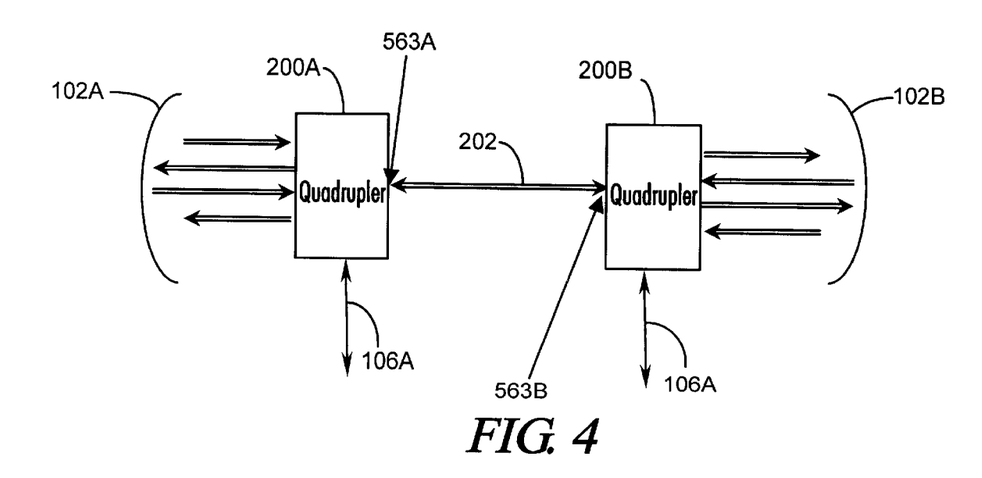
FIG. 4 is a schematic diagram of section of the network of FIG. 2, showing the two fiber quadrupler devices coupled by a single linking fiber.
Figure 5:
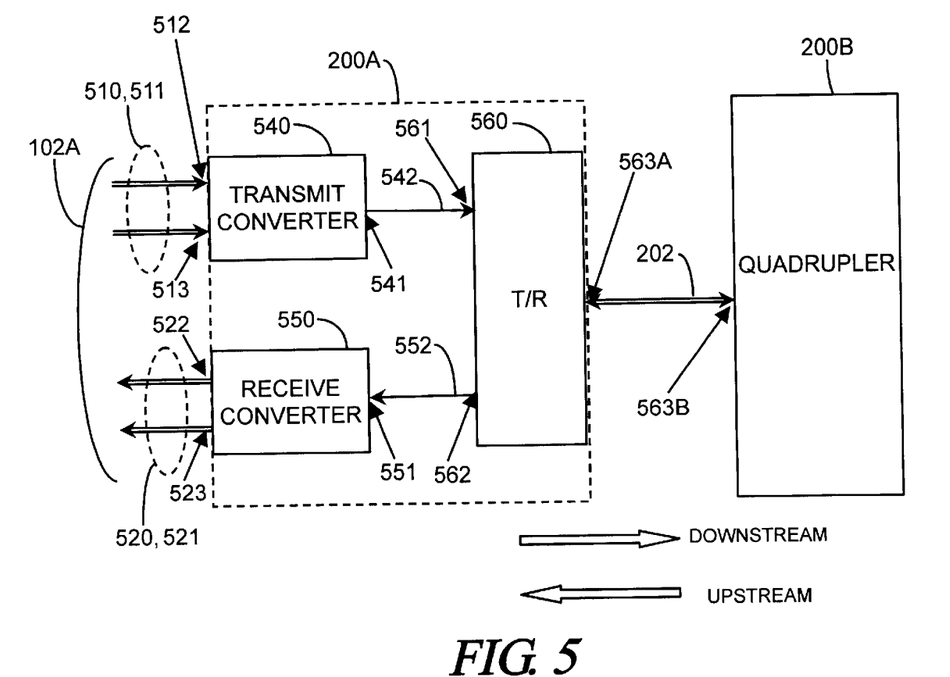
FIG. 5 is a block diagram of an RF subcarrier modulation (SCM) embodiment of the fiber quadrupler device of the present invention, linked by a single fiber to a second fiber quadrupler device, as shown in FIGS. 2, 3 and 4.

To replace the functionality of the four fibers of a SONET ring 102 with a single linking fiber 202 as shown in FIG. 2, and still provide full duplex communications, the fiber quadrupler devices 200A and B implement a signal multiplexing and demultiplexing scheme. In a preferred embodiment of the fiber quadrupler device 200A, as shown in block diagram form in FIG. 5, the multiplexing and demultiplexing is accomplished by converting the amplitude modulated upstream and downstream optical data signals to electrical signals. RF subcarrier modulation (SCM) is then used, while maintaining on the subcarriers the original amplitude modulation of the optical data. The direction of data flowing from left-to-right in FIGS. 4 and 5 is referred to as the downstream direction and from right-to-left, the upstream direction. The SONET ring 102 includes two input fibers 510, 511 to provide data paths for optical data flow in the downstream direction and two output fibers 520, 521 to provide data paths for optical data flow in the upstream direction. Data on the single linking fiber 202 flows in both directions, thereby providing a full duplex data connection to the second fiber quadrupler device 200B.

Figure 9:
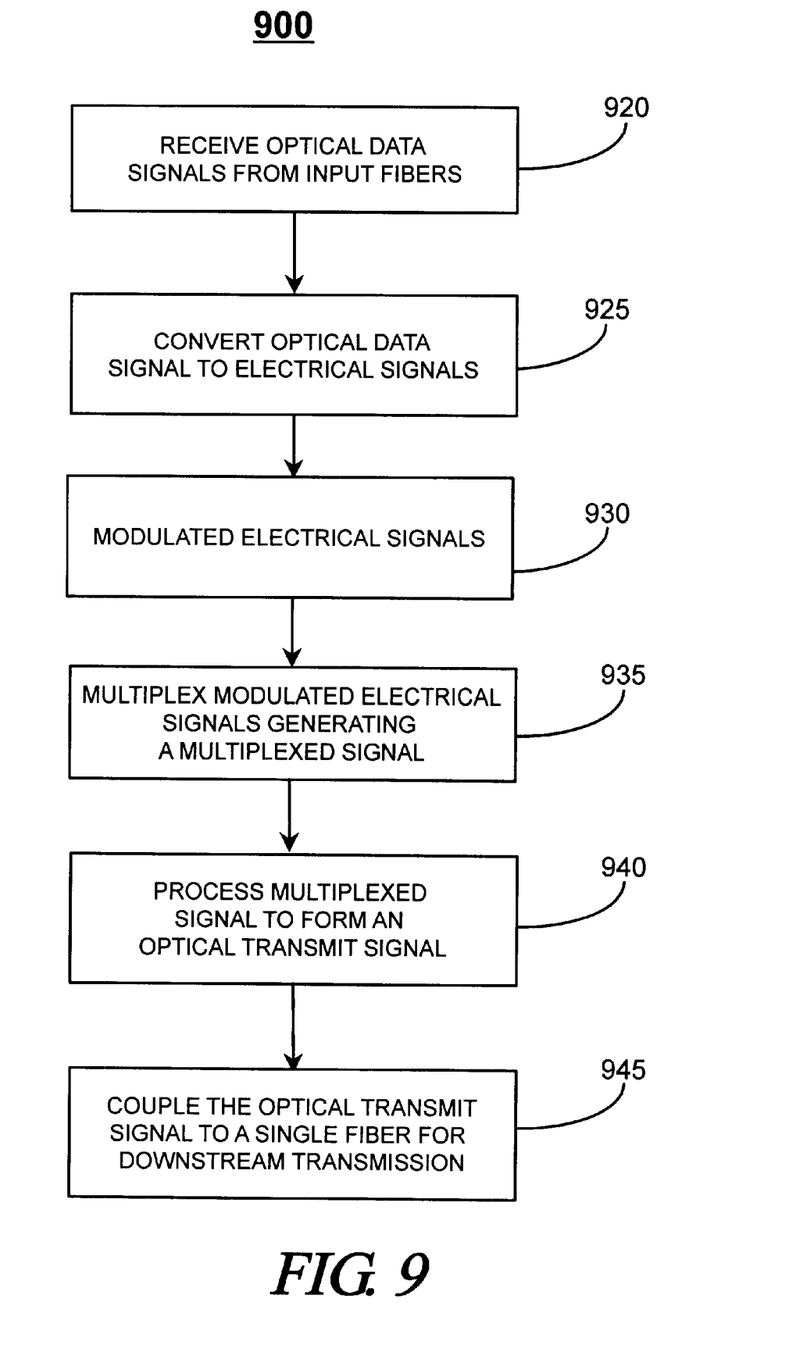
FIG. 9 is a flow chart description of the downstream data processing steps of the SCM embodiment of the method of the present invention.
Figure 10:
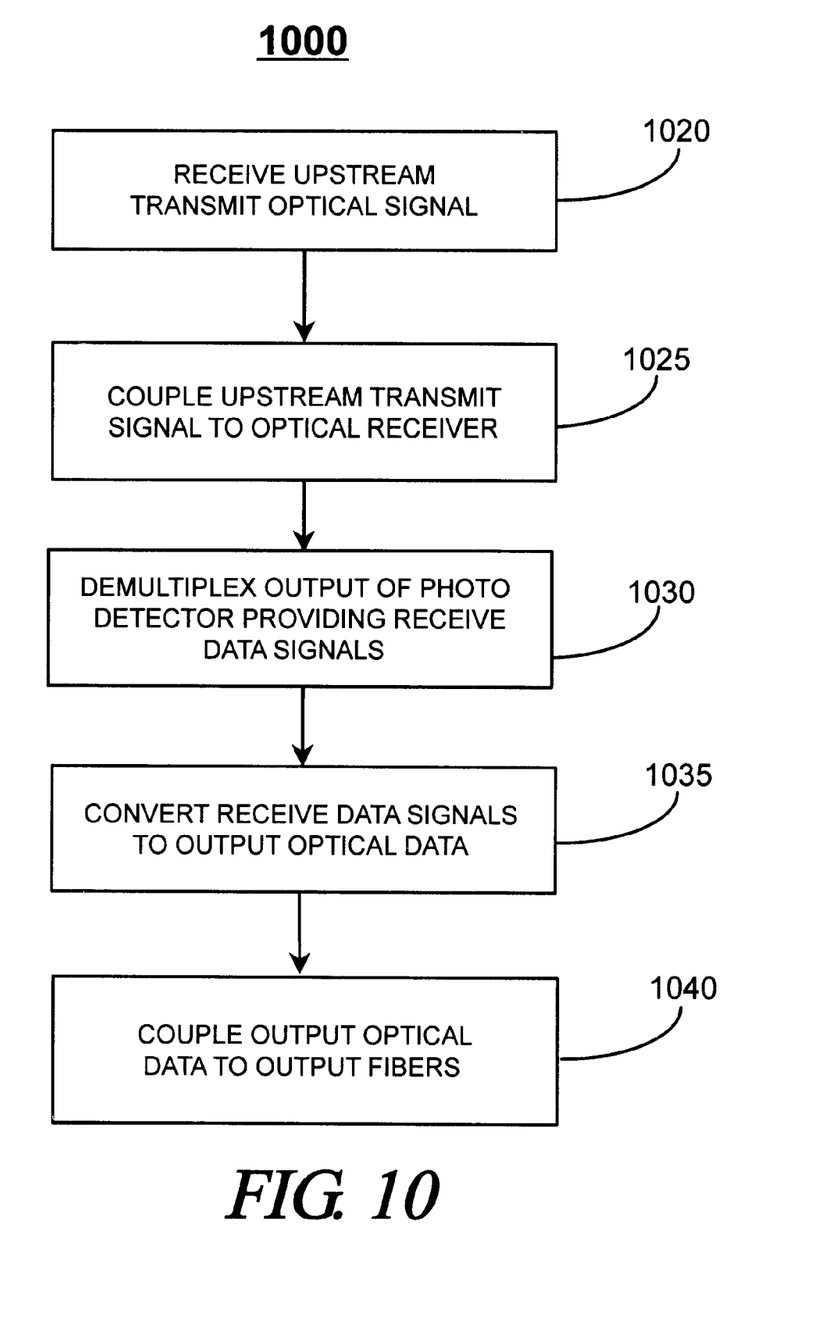
FIG. 10 is a flow chart description of the upstream data processing steps of the SCM embodiment of the method of the present invention.

Operation of the fiber quadrupler device 200 in accordance with the SCM embodiment and method of the present invention is summarized in the flow diagrams of FIG. 9 (downstream data) and FIG. 10 (upstream data). Downstream optical data, transmitted from an optical data source (not shown) connected to the SONET ring 102 is coupled from the two input fibers 510, 511 to first and second data inputs 512, 513 on a transmit converter 540. (Step 920) The transmit converter 540 converts the downstream optical data from input fibers 510, 511 into an SCM transmit signal 542 at transmit converter output 541. (Step 925) The transmit signal 542, which contains the two RF subcarriers corresponding to the downstream data provided at corresponding first and second data inputs 512, 513, is electrically coupled to a transmit signal input 561 of an optical transceiver 560. (Steps 930, 935, 940) The optical transceiver 560 converts the transmit signal 542 into an SCM downstream optical signal, and directs the downstream optical signal to linking fiber connector 563A, for coupling to the single linking fiber 202 which is optically coupled to fiber quadrupler device 200B at connector 563B. (Step 945).

Upstream optical data sent across linking fiber 202 from fiber quadrupler device 200B is also in SCM format, and is directed and converted into an SCM electrical receive signal 552 by optical transceiver 560 at receive signal output 562. (Step 1020) The SCM receive signal 552 is electrically coupled to input 551 of receive converter 550. (Step 1025) The receive converter 550 demultiplexes the receive signal by separating the two upstream RF subcarriers, converting them to separate upstream optical signals corresponding to the two subcarriers, and coupling the two upstream optical signals to the two output fibers 520, 521 at first and second data outputs 522, 523. (Steps 1030, 1035, 1040) The upstream optical signals are then sent further upstream along the SONET ring 102.

This description of the operation of the fiber quadrupler device 200A assumes that there is data present on all four fibers of the SONET ring 102. This may not be the case in practice, where conventionally two of the fibers are used for protection rather than active data transmission, and may be carrying only framing information and idle fields. However, a suitable connection to the SONET ring 102, such as provided in this invention, must account for and accommodate the possibility that data may be moved from one or both active fibers to one or both protection fibers due to a fiber failure or other event.

Figure 6:
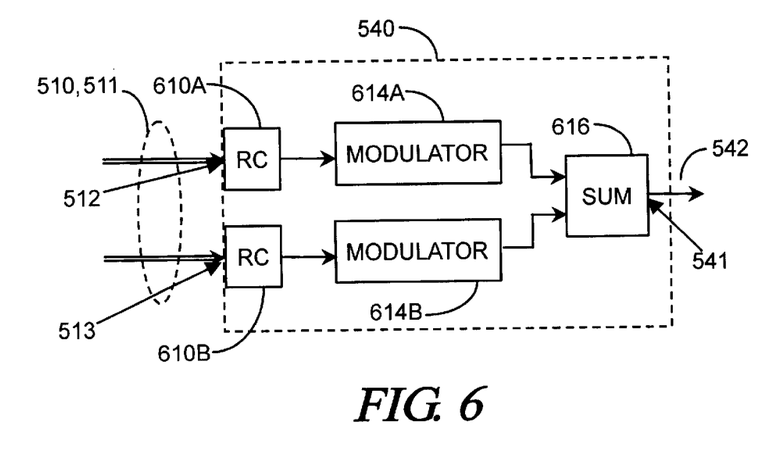
FIG. 6 is a block diagram of the transmit converter used in the fiber quadrupler device of FIG. 5.

Details of the transmit converter 540 are shown in block diagram form in FIG. 6. The first and second input fibers 510, 511 are optically coupled to respective first and second optical receivers 610A and 610B through first and second data inputs 512, 513. The optical receivers 610A, B may be, for example, low-cost photo diodes. However other optical detectors known to those skilled in the art could serve to convert the input optical signals to electrical signals. The converted electrical signals from each of the optical receivers 610A, B are electrically coupled to the inputs of first and second modulators 614A and 614B. In a preferred embodiment, the first modulator 614A includes an oscillator operating at a first modulation frequency and coupled to an RF mixer. When conventionally mixed with the output of the first optical receiver 610A, a first downstream RF subcarrier is generated having a subcarrier frequency determined in part by the first modulation frequency, and that is amplitude modulated in accordance with the optical data provided at first data input 512. The second modulator 614B operates in a similar manner but at a second modulation frequency that produces a second downstream RF subcarrier having a subcarrier frequency that is different from the first downstream RF subcarrier. Any number of standard RF modulator devices can be used, such as the AD9852 from Analog Devices, Inc. The second downstream RF subcarrier is amplitude modulated in accordance with the optical data provided at second data input 513. The first and second modulation frequencies are chosen to provide for separation of the RF subcarriers in the frequency domain so that filtering and selection of the subcarriers during demodulation in fiber quadrupler device 200B can be effectively carried out. For example, a separation of 155 MHz between the subcarriers and the carrier frequency can be used. Also, in some applications, a carrier and only one subcarrier are needed, with the second modulator either eliminated or operated at zero frequency. Other forms of modulation known to those skilled in the art, including QAM, CAP, FSK, and PSK, could be used to provide separation of the electrical signals.

The outputs of the first and second modulators 614A, B are combined by a signal summer 616, which can be a conventional summing amplifier. The output of summer 616 is electrically coupled to the transmit converter output 541, as SCM transmit signal 542.

Figure 7:
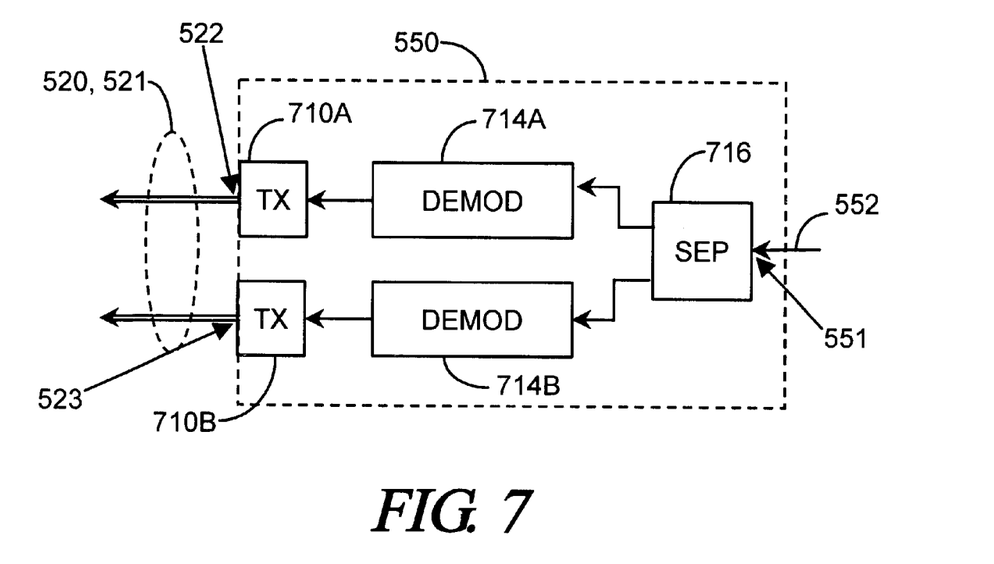
FIG. 7 is a block diagram of the receive converter used in the fiber quadrupler device of FIG. 5.

The receive converter 550 is further described in block diagram form in FIG. 7. The receive signal 552 from the optical transceiver 560 (FIG. 5) is coupled to receive converter input 551 as a multiplexed (SCM) electrical signal containing the first and second upstream RF subcarriers sent over the linking fiber 202. Input 551 is connected to signal separator 716 which acts as a demultiplexer to separate the upstream RF subcarriers from the receive signal 552 in a conventional manner, such as by use of bandpass filtering selectively tuned to the respective first and second upstream subcarrier frequencies. The signal separator 716 directs the separated upstream subcarrier signals to demodulators 714A and 714B. The demodulators 714A, B are also conventional and can use an envelope detector followed by a low pass filter to isolate the amplitude modulated data from the upstream subcarriers. The outputs of demodulators 714A, B are then converted to optical signals in corresponding optical transmitters 710A and 710B which are optically coupled to output fibers 520 and 521 at first and second data outputs 522 and 523. Preferably, the optical transmitters 710A, B are conventional, low cost light emitting diodes (LEDs) or other electrical to light converting devices known to those skilled in the art.

Figure 8:
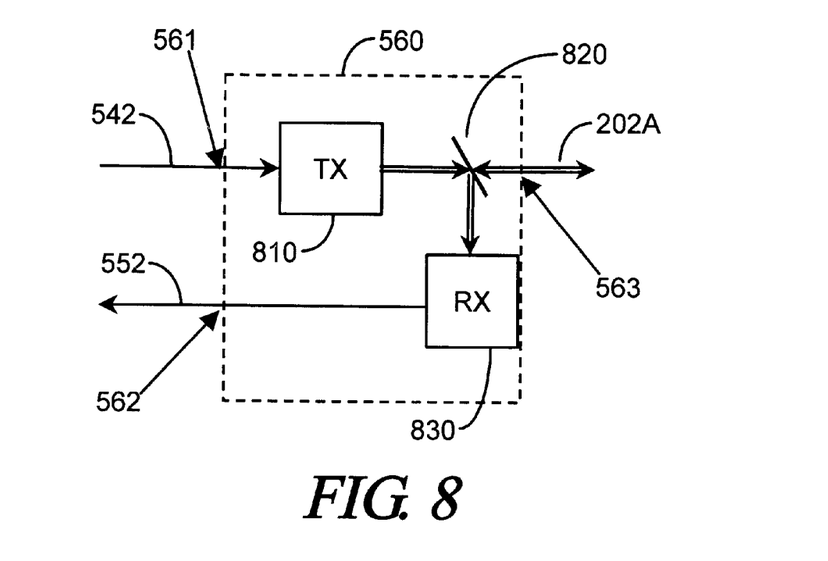
FIG. 8 is a block diagram of the optical transceiver used in the fiber quadrupler device of FIG. 5.

The optical transceiver 560 of a preferred embodiment is illustrated in FIG. 8. The SCM transmit signal 542 from the transmit converter 540 (FIGS. 5 and 6) is electrically coupled at transmit signal input 561 to a third optical transmitter 810. The optical transmitter 810 converts the transmit signal 542 (containing the two downstream RF subcarriers) into an optical signal suitable for downstream transmission over the linking fiber 202. However, because the linking fiber 202 serves as a duplex communications channel, an optical splitter 820 is used to separate the transmit (downstream) optical signal from the receive (upstream) optical signal. The optical splitter 820 can be a directional mirror splitter, an optical circulator, or other conventional optical component suitable for directing diverse optical signals along different optical paths. For example, the optical splitter 820 can be implemented using color filters, where upstream and downstream data are transmitted at different optical wavelengths corresponding to the pass bands of the filters.

When the receive signal, traveling in the upstream direction, enters the optical transceiver 560, the splitter 820 directs the receive optical signal to third optical receiver 830. The third optical receiver 830 may also be a photo diode or similar conventional component known to those skilled in the art that converts the receive optical signal into an electrical SCM receive signal 552. The SCM receive signal 552 is then electrically coupled to the receive converter 550 for demultiplexing and upstream transmission over the two output fibers 520, 521 as described above.

Because of the processing of optical signals in the fiber quadrupler device 200 as described, the optical signal strengths are reduced as compared to a conventional SONET ring system. Although this reduction in optical signal strength will be unimportant in many applications, the difference could be a factor in marginal systems. To compensate, one preferred embodiment of the third optical transmitter 810 will use a laser diode having a nominal output wavelength of 1550 nm. This will provide an optical signal that is subject to less attenuation in standard silica fibers as compared to other wavelengths.

Figure 11:
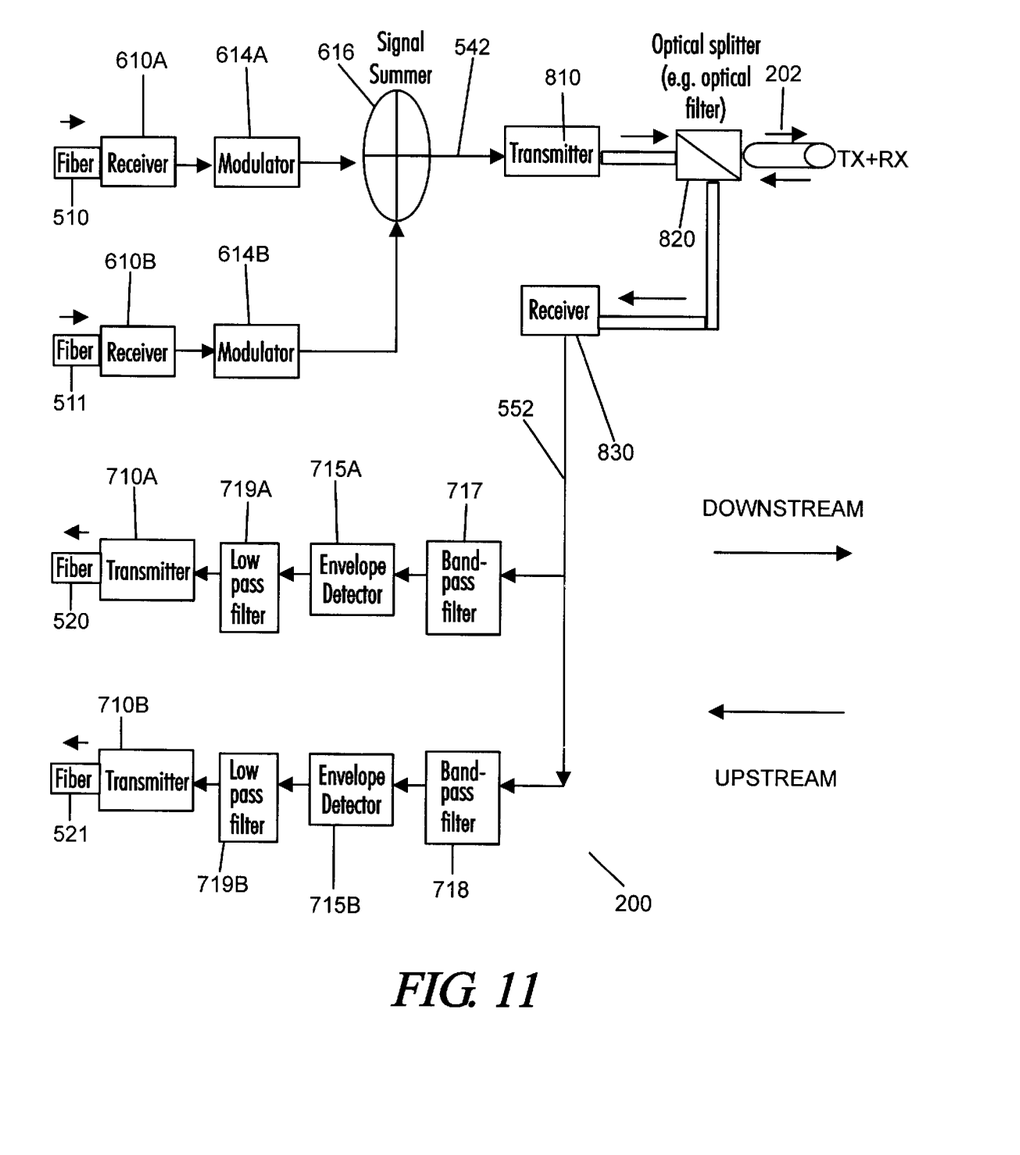
FIG. 11 is a detailed block diagram of the SCM fiber quadrupler device of FIGS. 5 through 9.

FIG. 11 provides in block diagram form still more detail about a preferred SCM embodiment of fiber quadrupler device 200 as described above with reference to FIGS. 5 through 10. First, second, and third optical receivers 610A, 610B and 830 are photodiodes (such as a Model HFBR-5204 from Hewlett Packard). The third optical transmitter 810 is preferably a laser diode nominally tuned to 1550 nm. Such diodes are available from JDS Uniphase as Model No. CQF61/CQF58. The first demodulator includes a first bandpass filter 717 tuned to the frequency of the first upstream RF carrier, followed by a first envelope detector 715A, a first low pass filter 719A, and an LED functioning as the first optical transmitter 710A. The second demodulator uses a second band pass filter 718 tuned to the frequency of the second upstream RF carrier, followed by a second envelope detector 715B, second low pass filter 719B, and an LED second optical transmitter 710B.

Figure 12:
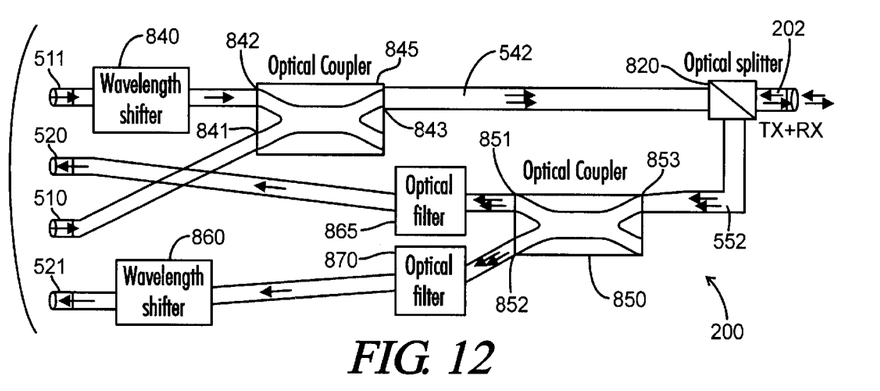
FIG. 12 is a schematic diagram of a second embodiment of the fiber quadrupler device of the present invention, using wavelength division multiplexing of the downstream data and wavelength selective demultiplexing of the upstream data.

A wavelength division modulation (WDM) embodiment of the fiber quadrupler device 200 of this invention is shown in FIG. 12. A first downstream optical data signal coming from first input fiber 510 is optically coupled to a first input 841 of a downstream optical coupler 845. The first downstream optical signal is preferably amplitude modulated at a first downstream carrier wavelength. The second downstream optical signal coming from second input fiber 511 is optically coupled to a downstream wavelength shifter 840 which changes the wavelength of the second downstream optical signal to a second upstream carrier wavelength that is different from the first downstream carrier wavelength. The wavelength shifted second downstream signal is optically coupled to a second input 842 of optical coupler 845 to produce a multiplexed optical transmit signal 542. The optical splitter 820 directs the transmit signal through the single linking fiber 202 to another network element (not shown).

The upstream data sent across linking fiber 202 from another fiber quadrupler device 200 (not shown) is contained in a WDM optical receive signal 552 containing data incorporated in amplitude modulated first and second upstream carriers. The receive signal 552 is directed by splitter 820 to input 853 of an upstream optical coupler 850. The first and second outputs 851, 852 of coupler 850 are optically coupled to corresponding first and second optical filters 865 and 870. The first and second optical filters 865 and 870 act as wavelength selective demultiplexers by being tuned to transmit only those optical signals at the first and second upstream carrier wavelengths respectively. The output of the second optical filter 870 is optically coupled to an upstream wavelength shifter 860 designed to shift the wavelength of the second upstream carrier back to a wavelength usable by the other network elements upstream in the optical data system. The upstream data signals are then coupled to first and second output fibers 520, 521. In some applications, it may be preferable to wavelength shift each of the upstream and downstream carriers by using an additional wavelength shifter in each upstream and downstream signal path. The upstream and downstream optical couplers are conventional 2×2 star coupler devices.

Figure 3:
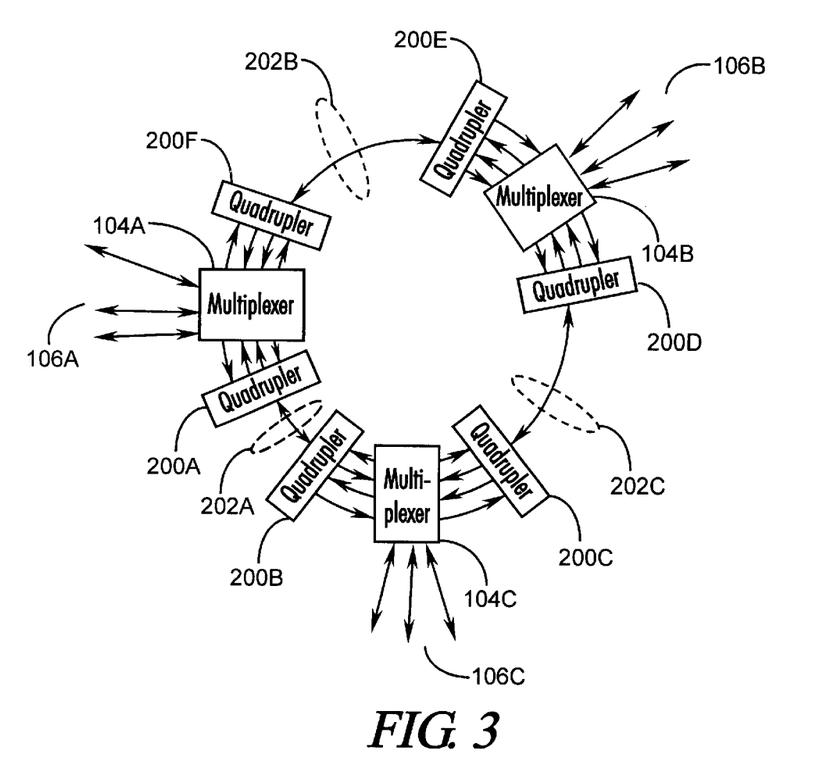
FIG. 3 is a schematic diagram of an optical data communication system using six fiber quadrupler devices linked by a single fiber in accordance with the present invention.

The diagram of FIG. 3 illustrates a use of the present invention in an optical data communication system 100 having a ring topology that includes a local loop access system such as the Total Access Intelligent Access System (TAS) available from ADTRAN, Inc. of Huntsville, Ala. The TAS has modules 200A–F for coupling to network elements 106A, B, and C, management elements (not shown), and loop elements (not shown). The network elements 106 may include, for example, a SONET ring fiber system, an ISDN voice switch telephone network, or other network devices. In prior art systems, at least two fibers were used to couple a TAS interface circuit to a SONET ring or other fiber system. In accordance with the present invention, the system 100 as shown in FIG. 3 uses a single linking fiber 202, which may be a single mode or a multimode fiber, connecting TAS modules having integral fiber quadrupler devices 200A–F. Management of the system may be accomplished via a management station, a VT100 terminal, or other management devices. The local loop elements may be an ISDN terminal adapter, a symmetric digital subscriber loop (SDSL) or other elements used to provide existing and future loop services. The single fiber 202 provides full duplex data transfers between the system and the network elements 106A, B, and C. The use of a single fiber is an efficient use of an optical fiber and may free other fibers in a fiber bundle for other applications.

Looking again at the optical data system 100 of FIG. 2, the fiber quadrupler devices 200A, B can be integrated with a conventional add/drop multiplexer having a multifiber port as an interface to the SONET ring fibers, an add/drop port for interfacing to one or more network elements 106, and a single fiber port corresponding to linking fiber connectors 563A and 563B associated the fiber quadrupler devices 200A, B (FIGS. 4 and 5). The add/drop multiplexer otherwise functions in a conventional manner by providing time selective access to the SONET ring 102 by network elements 106 connected to the add/drop port.

In similar fashion, the fiber quadrupler device and method of this invention can be integrated in other standard devices used in optical data systems, where a fiber efficient, full duplex communications link to a SONET ring is needed. Also, in some optical networks, it may be advantageous to combine in the fiber quadrupler devices of this invention a transmit converter that uses RF subcarrier multiplexing of the downstream data and a receive converter that performs wavelength division demultiplexing of the upstream data, or vice versa.

Figure 13:
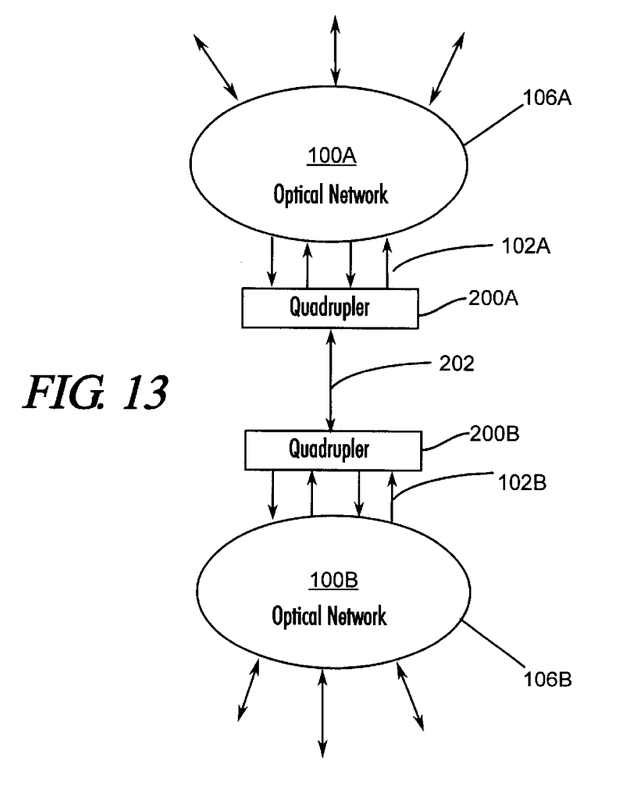
FIG. 13 is a block diagram of another embodiment of the invention in which two optical networks are linked by a single optical fiber to provide multichannel, full duplex communications.

FIG. 13 illustrates the use of two fiber quadruplers 200A, B of this invention to provide a multi-channel, full duplex optical communications link over a single fiber 202 between two optical networks 100A, B. One or both of the optical networks can be a SONET ring, providing access to other network elements, such as SONET access loops 106A, B. Each quadrupler device 200A, B communicates to the corresponding network 100A, B over SONET fibers 102A, B.

Although the embodiments of the present invention are shown and described as being used with two input fibers and two output fibers coupled to a single fiber, the fiber quadrupler devices can be adapted for use with a SONET having more than two input and output fibers, without departing from the scope of the present invention.

Thus, although there have been described particular embodiments of the present invention of a new and useful Fiber Quadrupler Device and Method for Providing Full Duplex Communications to a Synchronous Optical Network Over a Single Optical Fiber, it is not intended that such references be construed as limitations upon the scope of this invention except as set forth in the following claims.

What is claimed is:

1. A device for providing full duplex data communications over a single optical linking fiber between a first network element and a second network element having first and second data input fibers and first and second data output fibers comprising:

a. a transmit converter having first and second data inputs operatively coupled to respective first and second data input fibers, the transmit converter operative to convert and combine downstream optical signals received at the first and second data inputs into a multiplex transmit signal at a transmit converter output;

b. a receive converter having first and second data outputs operatively coupled to respective first and second data output fibers, the receive converter operative to convert a multiplexed receive signal provided at a receive converter input into separate upstream optical signals at the first and second data outputs;

c. an optical transceiver having a transmit signal input operatively coupled to the transmit converter output, a receive signal output operatively coupled to the receive converter input, an optical splitter operative to separate multiplexed upstream optical signals received from the second network element from the multiplexed downstream optical signals sent to the second network element, the optical transceiver further operative to generate the receive signal in response to multiplexed upstream optical signals received from the second network element and to generate the multiplexed downstream optical signals transmitted to the second network element in response to the transmit signal;

d. the optical transceiver further comprises a linking fiber connector to optically couple the optical splitter to the single linking fiber for full duplex communications with the second network element of downstream and upstream data contained in the multiplexed downstream and upstream optical signals;

e. wherein the transmit converter comprises
   a first optical receiver having an input optically coupled to the first data input and operative to generate a first RF signal responsive to the downstream data in the downstream optical signals provided at the first data input, at an output electrically coupled to an input of a first RF modulator,
   a second optical receiver having an input optically coupled to the second data input and operative to generate a second RF output signal responsive to the downstream data in the downstream optical signals provided at the second data input; and
   a signal summer having inputs electrically coupled to corresponding outputs of the first RF modulator and the second optical receiver, and an output electrically coupled to the transmit converter output, the summer responsive to the first and second RF output signals to generate the transmit signal.

2. The device of claim 1 wherein the receive converter comprises:
   a. a first optical transmitter having an output optically coupled to the first data output and an input electrically coupled to an output of a first demodulator;
   b. a second optical transmitter having an output optically coupled to the second data output and an input electrically coupled to an output of a second demodulator; and
   c. a signal separator having outputs electrically coupled to corresponding inputs of the first and second demodulators and an input electrically coupled to the receive converter input.

3. The device of claim 2 wherein the optical transceiver further comprises:
   a. a third optical transmitter having an input electrically coupled to the transmit signal input and an output optically coupled to the optical splitter; and
   b. a third optical receiver having an output electrically coupled to the receive signal output and an input optically coupled to the optical splitter.

4. The device of claim 3 wherein:
   a. the first RF modulator is operative to generate, at a first modulation frequency, a first downstream subcarrier that is modulated in response to the data in the downstream optical signals provided at the first data input;
   b. the transmit converter further comprises a second RF modulator electrically connected between the output of the second optical receiver and the corresponding input of the signal summer, the second modulator being operative to generate, at a second modulation frequency, a second downstream subcarrier that is modulated in response to the data in the downstream optical signals provided at the second data input; and
   c. wherein the data in the downstream optical signals provided at the first and second data inputs are represented in the transmit signal and in the multiplexed downstream optical signals sent to the network element through the linking fiber as first and second modulated downstream subcarriers separated by a difference between the first and second modulation frequencies.

5. The device of claim 4 wherein:
   a. the multiplexed upstream optical signals received from the network element include first and second upstream subcarriers modulated in accordance with first and second data channels transmitted from the network element and separated by a difference in upstream modulation frequencies;
   b. the signal separator is operative to separate the first upstream subcarrier from the second upstream subcarrier;
   c. the first demodulator is operative to detect from the first upstream subcarrier the modulation representing the first channel of the upstream data received from the network element;
   d. the second demodulator is operative to detect from the second upstream subcarrier the modulation representing the second channel of the upstream data received from the network element; and
   e. wherein the first channel of the upstream data received from the network element is provided in the upstream optical signals at the first data output and the second channel of the upstream data received from the network element is provided in the upstream optical signals at the second data output.

6. The device of claim 5 wherein the first demodulator comprises a first filter tuned to accept the first upstream subcarrier and to reject the second upstream subcarrier, and the second demodulator comprises a second filter tuned to accept the second upstream carrier and reject the first upstream subcarrier.

7. The device of claim 6 wherein the upstream and downstream optical signals are amplitude modulated.

8. The device of claim 7 wherein the first modulator comprises an oscillator tuned to the first modulation frequency and a first RF mixer, and the second modulator comprises an oscillator tuned to the second modulation frequency and a second RF mixer.

9. The device of claim 8 wherein the first and second demodulators each further comprise an envelope detector.

10. The device of claim 6 wherein optical splitter comprises a directional mirror splitter.

11. The device of claim 6 wherein the optical splitter comprises optical filters.

12. The device of claim 3 wherein the third optical transmitter comprises a laser diode.

13. The device of claim 12 wherein the laser diode generates an output wavelength of substantially 1550 nm.

14. A device for providing full duplex data communications over a single optical linking fiber between a first network element and a second network element having first and second data input fibers and first and second data output fibers comprising:
   a. a transmit converter having first and second data inputs operatively coupled to respective first and second data input fibers, the transmit converter operative to convert and combine downstream optical signals received at the first and second data inputs into a multiplex transmit signal at a transmit converter output;
   b. a receive converter having first and second data outputs operatively coupled to respective first and second data output fibers, the receive converter operative to convert a multiplexed receive signal provided at a receive converter input into separate upstream optical signals at the first and second data outputs;

c. an optical transceiver having a transmit signal input operatively coupled to the transmit converter output, a receive signal output operatively coupled to the receive converter input, an optical splitter operative to separate multiplexed upstream optical signals received from the second network element from the multiplexed downstream optical signals sent to the second network element, the optical transceiver further operative to generate the receive signal in response to multiplexed upstream optical signals received from the second network element and to generate the multiplexed downstream optical signals transmitted to the second network element in response to the transmit signal;

d. the optical transceiver further comprises a linking fiber connector to optically couple the optical splitter to the single linking fiber for full duplex communications with the second network element of downstream and upstream data contained in the multiplexed downstream and upstream optical signals;

e. wherein the transmit converter comprises
 a first wavelength shifter having an input optically coupled to the first data input and operative to shift the downstream optical signals provided at the first data input from a first downstream wavelength to a second downstream wavelength, at an output optically coupled to a first input of a first optical coupler; and
 the first optical coupler having a second input optically coupled to the second data input and an output optically coupled to the transmit converter output, the first optical coupler responsive to the downstream optical signals received at the first and second data inputs to generate the transmit signal, the transmit signal having optical signals at the first downstream wavelength corresponding to the downstream optical signals provided at the second data input, combined with optical signals at the second downstream wavelength corresponding to downstream optical signals provided at the first data input.

15. The device of claim 14 wherein the receive converter comprises:

a. a first optical filter having an output optically coupled to the first data output and an input optically coupled to a first output of a second optical coupler;

b. a second optical filter having an output optically coupled to a second wavelength shifter and an input optically coupled to a second output of a second optical coupler;

c. the second optical coupler having an input optically coupled to the receive converter input and operative to couple the upstream optical signals to the first and second optical filters;

d. wherein the upstream data in the upstream optical signals received from the network element includes a first data channel transmitted at a first upstream wavelength and a second data channel transmitted at a second upstream wavelength that is shifted from the first upstream wavelength;

e. the first optical filter is tuned to the first upstream wavelength and the second optical filter is tuned to the second upstream wavelength; and f. wherein the second wavelength shifter is operative to shift the second upstream wavelength.

16. An optical data system comprising:

a. a synchronous optical network (SONET) ring having four optical fibers;

b. a plurality of add/drop multiplexers, each of the add/drop multiplexers having a multifiber port connected to the four optical fibers in the SONET ring and an add/drop port, the add/drop multiplexers operative to receive upstream data from a network device and transmit the upstream data to the SONET ring, and to receive downstream data from the SONET ring and transmit the downstream data to the network device;

c. a first of the add/drop multiplexers further including a first fiber quadrupler and a second of the add/drop multiplexers further including a second fiber quadrupler, the first fiber quadrupler having a first single fiber port optically coupled to a second single fiber port on the second fiber quadrupler by a single linking fiber;

d. each of the first and second fiber quadruplers including a transmit converter operatively coupled to an optical transceiver, and operative to receive and combine first and second downstream data signals from a first pair of the SONET ring fibers into a multiplexed downstream signal transmitted across the single linking fiber;

e. each of the first and second fiber quadruplers further including a receive converter operatively coupled to the optical transceiver and optically coupled to a second pair of the SONET ring fibers, each of the receive converters operative to receive multiplexed upstream data from the single linking fiber, to separate the multiplexed upstream data into separate upstream data signals, and to direct the separate upstream data signals to the second pair of the SONET ring fibers;

f. the transmit converter comprises a wavelength shifter having an input optically coupled to a first of the SONET ring fibers, and an output optically coupled to a first input of the first optical coupler;

g. the optical coupler has a second input optically coupled to a second of the SONET ring fibers and an output optically coupled to an optical splitter in the optical transceiver;

h. the receive converter comprises a second optical coupler having an input optically coupled to the optical splitter, a first output optically coupled to an input of a first optical filter and a second output optically coupled to an input of a second optical filter; and i. the first optical filter having an output optically coupled to a third of the SONET ring fibers and the second optical filter having an output optically coupled to a fourth of the SONET ring fibers through a second wavelength shifter.

17. A device for providing full duplex communications of upstream and downstream optical data over a single linking fiber in a synchronous optical network (SONET) ring comprising:

a. first and second data inputs adapted to receive the downstream optical data from first and second data input fibers in the SONET ring;

b. first and second data outputs adapted to couple the upstream optical data to first and second data output fibers in the SONET ring;

c. multiplexer means to combine separate downstream data signals at the first and second data inputs into a single multiplexed downstream data signal for transmission across the single linking fiber;

d. demultiplexer means to separate the upstream data sent across the single linking fiber into separate upstream data signals for coupling to the first and second data outputs;

e. optical transceiver means for selectively directing the upstream data sent across the single linking fiber to the demultiplexer means and for selectively directing the downstream data from the multiplexer means across the single linking fiber;

f. the multiplexer means comprises a first wavelength shifter optically coupled between the first data input and a first input of a first optical coupler; and g. the demultiplexer means comprises a second optical coupler having a first output optically coupled to a first optical filter and a second output optically coupled to a second wavelength shifter through a second optical filter.

18. A method of providing full duplex data communications of upstream and downstream data over a single linking fiber between a synchronous optical network (SONET) ring and a network element comprising the steps of:

a. coupling first and second data input fibers from the SONET ring to a transmit converter and first and second data output fibers from the SONET ring to a receive converter;

b. combining in the transmit converter first and second downstream data signals from the first and second data input fibers into a single multiplexed downstream data signal;

c. optically coupling the multiplexed downstream data signal to the single linking fiber for transmission to the network element;

d. optically coupling multiplexed upstream data received from the network element over the single linking fiber to a receive converter;

e. separating in the receive converter the multiplexed upstream data into first and second upstream data signals;

f. optically coupling the first and second upstream data signals to the first and second data output fibers; and g. wherein the step of the combining the first and second downstream data signals is performed by generating, modulating and summing downstream RF subcarriers and the step of separating the first and second upstream data signals is performed by separating and demodulating upstream RF subcarriers.

19. The method of claim 18 wherein each of the upstream and downstream RF subcarriers are amplitude modulated.

20. The method of claim 18 wherein the step of separating the upstream RF subcarriers is performed by separating in an optical splitter the upstream data from the downstream data, converting the upstream data into an upstream RF signal, and passing the upstream RF signal through filters tuned to each of the upstream subcarriers.

21. The method of claim 20 wherein the step of demodulating the upstream RF subcarriers is performed by passing each of the separated upstream subcarriers though an envelope detector.

22. The method of claim 20 wherein the downstream optical signals transmitted over the single linking fiber have a nominal wavelength of 1550 nm.

23. A method of providing full duplex data communications of upstream and downstream data over a single linking fiber between a synchronous optical network (SONET) ring and a network element comprising the steps of:

a. coupling first and second data input fibers from the SONET ring to a transmit converter and first and second data output fibers from the SONET ring to a receive converter.

b. combining in the transmit converter first and second downstream data signals from the first and second data input fibers into a single multiplexed downstream data signal;

c. optically coupling the multiplexed downstream data signal to the single linking fiber for transmission to the network element;

d. optically coupling multiplexed upstream data received from the network element over the single linking fiber to a receive converter;

e. separating in the receive converter the multiplexed upstream data into first and second upstream data signals;

f. optically coupling the first and second upstream data signals to the first and second data output fibers; and g. wherein the step of combining the first and second downstream data signals is performed by optical wavelength division multiplexing and the step of separating the first and second upstream data signals is performed by optical wavelength division demultiplexing.

* * * * *